Inventors:
Ernst F.W. Alexanderson,
Albert H. Mittag,
by *(signature)*
Their Attorney.

Patented Jan. 3, 1928.

1,655,039

UNITED STATES PATENT OFFICE.

ERNST F. W. ALEXANDERSON AND ALBERT H. MITTAG, OF SCHENECTADY, NEW YORK, ASSIGNORS TO GENERAL ELECTRIC COMPANY, A CORPORATION OF NEW YORK.

SPEED-CONTROL SYSTEM.

Application filed September 2, 1925. Serial No. 54,160.

Our invention relates to speed control systems, and has for its principal object the provision of an improved method and apparatus whereby the speed of a direct current machine connected to an alternating current system through an electric valve apparatus may be varied over a wide range without great change in the armature voltage of the machine.

In our copending application for Letters Patent of the United States, Serial No. 25,913, filed April 25, 1925, we have disclosed an arrangement wherein the speed of a direct current machine having its armature circuit connected to an alternating current system through an electric valve apparatus is controlled by variation in the phase relation between the grid and anode voltages of the electric valve. Our present invention is in some respects similar to that disclosed by the aforesaid application, but differs therefrom in that it comprises means whereby the armature and field voltages of the machine are correlated in a manner to minimize the armature voltage variations required to control the machine speed over a wide range.

Our invention will be better understood from the following description when considered in connection with the accompanying drawings and its scope will be pointed out in the appended claims.

Figure 1:
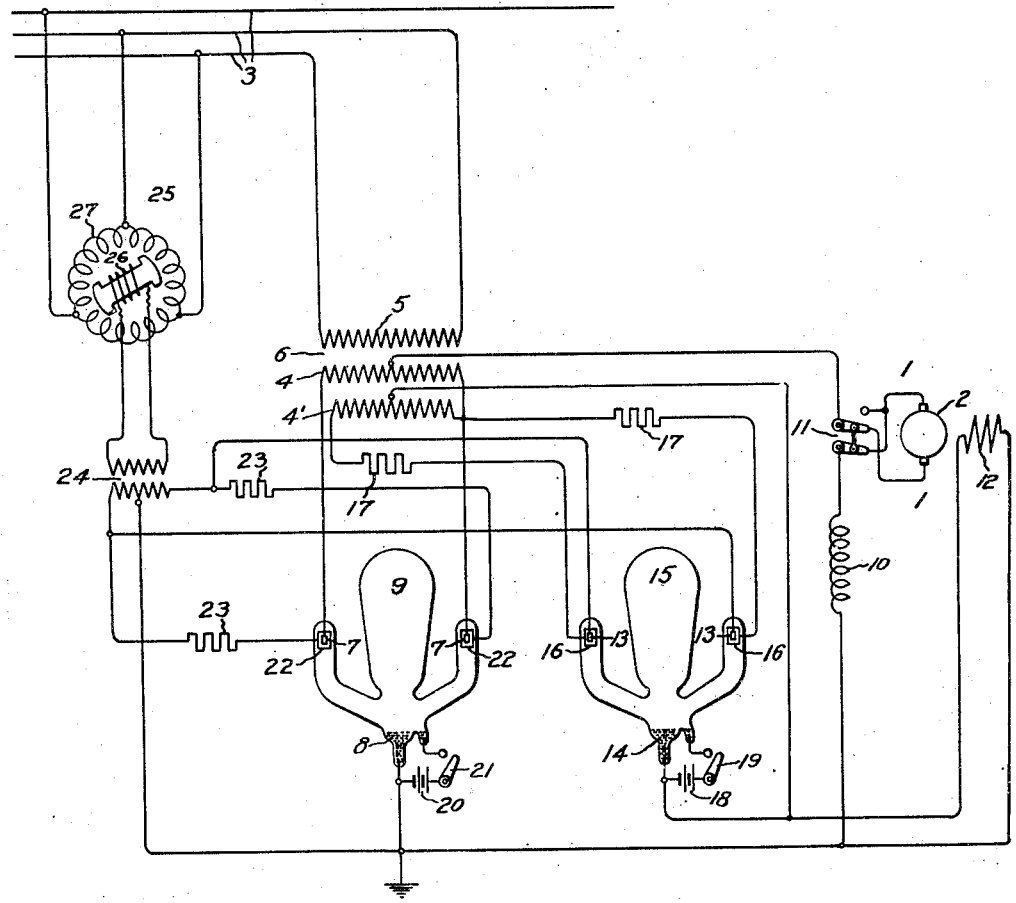
Figure 2:
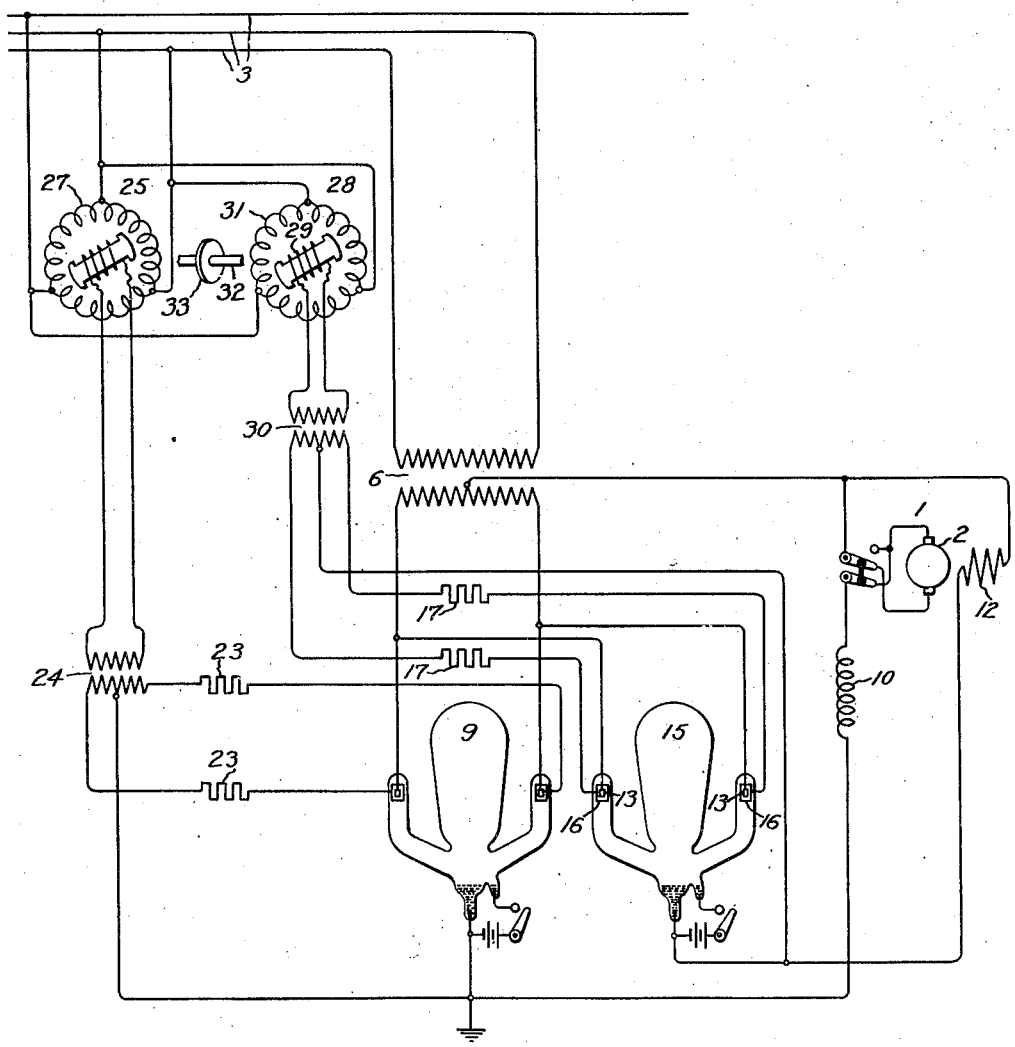

Referring to the drawings, Fig. 1 shows a system wherein a single phase control device is provided for controlling the grid potentials of electric valves connected respectively in the field and armature circuits of a direct current machine; and Fig. 2 shows a system comprising a modified form of phase control apparatus.

Fig. 1 shows a direct current machine 1 comprising an armature winding 2 connected through windings 4 and 5 of a transformer 6, anodes 7 and cathode 8 of an electric valve device 9, a reactor 10 and a reversing switch 11 to a polyphase line 3 and a field winding 12 connected through a phase control device 25, a transformer 24 and anodes 13 and cathode 14 of an electric valve 15 to the polyphase line 3. The device 15 is provided with grids 16 connected to the terminals of the transformer winding 4' through resistors 17 and with the usual source of current 18 and switch 19 for initiating its operation. The valve device 9 is provided with a source of current 20 and a switch 21 for initiating its operation and with grids 22 which are connected through resistors 23 to the secondary circuit of the potential transformer 24. The phase control device 25 comprises a rotor winding 26 connected to the primary circuit of transformer 24 and a stator winding 27 connected to the line 3 is provided for controlling the phase relation between the grid and anode voltages of the devices 9 and 15. It will be observed that the anodes 13 of device 15 and the grids 22 of device 9 are connected in reverse order to the secondary circuit of the potential transformer 24. With these connections, the armature and field voltages of the machine 1 are varied in opposite directions in response to operation of the phase control device 25.

Assuming the rotor of the phase control device 25 to be in a position where the potentials of grids 22 are opposed to those of anodes 7 and the potentials of anodes 13 are in phase with those of grids 16, no current is transmitted through the armature circuit of machine 1, maximum current is transmitted through the field circuit of the machine, and the machine is at a standstill. In order to accelerate the machine, the phase control device 25 is operated in a manner to advance the phase of the potential applied through this device to the grids of valve 9, and the anodes of valve 15. Under these conditions, the voltage applied to the armature circuit 2 is increased, the voltage applied to the field circuit 12 is decreased and the machine is accelerated to a speed dependent on the magnitudes of its field and armature voltages. Deceleration of the machine is produced by moving the rotor of the phase control device to its original position. It should be noted that the anodes of valves 9 and 15 may be connected to the terminals of winding 4 and that separate phase control devices may be provided for controlling the potentials of grids 16 and 22.

Fig. 2 shows a system wherein the potential of grids 16 is controlled by a phase control device 28 to the rotor winding 29 of which they are connected through resistors 17 and a potential transformer 30. It will be observed that the phase control device 28 comprises a polyphase stator winding 31 connected to line 3 in a manner to produce a magnetic field rotating in a direction opposite to that in which the field produced by polyphase winding 27 rotates, and that the rotor members of devices 25 and 28 are coupled together through a shaft 32 provided with a handwheel 33 for varying the field and armature voltages in opposite directions as previously explained. It will be readily understood that the valve devices 9 and 15 may be replaced by a single valve device when the transformer 6 is provided with separate secondary circuits for supplying current to the valve elements.

The embodiments of the invention illustrated and described herein have been selected for the purpose of clearly setting forth the principles involved. It will be apparent, however, that the invention is susceptible of being modified to meet the different conditions encountered in its use and we therefore aim to cover by the appended claims all modifications within the true spirit and scope of our invention.

What we claim as new and desire to secure by Letters Patent of the United States is:

1. The combination of an alternating current circuit, a direct current machine provided with field and armature circuits, electric valve apparatus provided with a grid and anode arranged to control the current of said armature circuit and with a grid and anode arranged to control the current of said field circuit, and phase control means arranged to advance the potential of one of said grids with respect to the potential of one of said anodes and to advance the potential of one of said anodes with respect to the potential of another of said grids.

2. The combination of an alternating current circuit, a direct current machine provided with field and armature windings, electric valve apparatus comprising an anode for controlling the voltage of said field winding and a grid for controlling the voltage of said armature winding, and a phase control device interconnected with said anode and said grid for simultaneously varying the phase of the potentials applied to said grid and anode.

3. The method of operating a system comprising an alternating current circuit and a direct current machine connected to said circuit through electric valve apparatus comprising an anode for controlling the field current of said machine and a grid for controlling the armature current of said machine which comprises simultaneously changing the phase of the potentials applied to said anode and grid.

4. The method of operating a system comprising an alternating current circuit and a direct current machine connected to said circuit through electric valve apparatus provided with a grid and an anode for controlling the field current of said machine and with a grid and an anode for controlling the armature current of said machine which comprises simultaneously varying the phase of the potentials of one of said grids and one of said anodes.

5. The combination of an alternating current circuit, a direct current machine provided with field and armature windings, electric valve apparatus comprising a grid and an anode for controlling the relation between the voltages of said circuit and said armature winding and a grid and anode for controlling the relation between the voltages of said circuit and said field winding, and means for changing the phase relation between the potentials of said grids and said anodes in opposite directions.

6. The combination of an alternating current circuit, a direct current machine provided with field and armature windings, electric valve apparatus comprising a grid and an anode for controlling the relation between the voltages of said circuit and said armature winding and a grid and anode for controlling the relation between the voltages of said circuit and said field winding, and a phase control device for simultaneously advancing the phase of the potential applied to one of said grids with respect to the potential applied to one of said anodes and retarding the phase of the potential applied to the other of said grids with respect to the potential applied to the other of said anodes.

In witness whereof, we have hereunto set our hands this 1st day of September, 1925.

ERNST F. W. ALEXANDERSON.
ALBERT H. MITTAG.